United States Patent
Wang

(10) Patent No.: US 9,329,730 B2
(45) Date of Patent: May 3, 2016

(54) COLOR FILTER SUBSTRATE, METHOD FOR MANUFACTURING THE SAME AND TOUCH-TYPE LIQUID CRYSTAL DISPLAY PANEL

(75) Inventor: Haisheng Wang, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 833 days.

(21) Appl. No.: 13/486,297

(22) Filed: Jun. 1, 2012

(65) Prior Publication Data

US 2012/0307185 A1    Dec. 6, 2012

(30) Foreign Application Priority Data

Jun. 3, 2011    (CN) .......................... 2011 1 0149996

(51) Int. Cl.
*G02F 1/1335* (2006.01)
*G06F 3/044* (2006.01)
*G02F 1/1333* (2006.01)

(52) U.S. Cl.
CPC ............ *G06F 3/044* (2013.01); *G02F 1/13338* (2013.01); *G02F 1/133514* (2013.01); *Y10T 29/4913* (2015.01)

(58) Field of Classification Search
CPC ............................... G06F 3/044; G06F 3/0412
USPC .................................... 349/12; 345/174, 175
See application file for complete search history.

(56) References Cited

U.S. PATENT DOCUMENTS

| | | | | |
|---|---|---|---|---|
| 6,060,756 A | * | 5/2000 | Machida et al. | 257/415 |
| 6,573,966 B1 | * | 6/2003 | Shimizu et al. | 349/141 |
| 2008/0062140 A1 | * | 3/2008 | Hotelling et al. | 345/173 |
| 2010/0182273 A1 | | 7/2010 | Noguchi et al. | |
| 2012/0044171 A1 | * | 2/2012 | Lee et al. | 345/173 |

FOREIGN PATENT DOCUMENTS

| | | |
|---|---|---|
| CN | 101681221 A | 3/2010 |
| CN | 102073164 A | 5/2011 |
| KR | 20080012594 A | 2/2008 |
| WO | 2006/054585 A1 | 5/2006 |

OTHER PUBLICATIONS

Machine translation of Danjiyou K et al (JP 09-2226114).*
First Chinese Office Action dated Jan. 21, 2014; Appln. No. 201110149996.9.
Second Chinese Office Action dated Jul. 7, 2014, Appln. No. 201110149996.9.
Chinese Rejection Deciscion Appln. No. 201110149996.9; Dated Mar. 25, 2015.

* cited by examiner

*Primary Examiner* — Lucy Chien
(74) *Attorney, Agent, or Firm* — Ladas & Parry LLP

(57) ABSTRACT

The embodiments of the present disclosure provide a color filter substrate, a method for manufacturing the same, and a touch type liquid crystal display panel capable of improving the performance of the touch type liquid crystal display panel. The color filter substrate comprises: a base substrate; a driving electrode disposed on a lower surface of the base substrate; a sensing electrode disposed on an upper surface of the base substrate; the driving electrode and the sensing electrode form a touch sensing capacitor with the base substrate as a dielectric layer.

14 Claims, 5 Drawing Sheets

COLOR FILTER SUBSTRATE, METHOD FOR MANUFACTURING THE SAME AND TOUCH-TYPE LIQUID CRYSTAL DISPLAY PANEL

BACKGROUND

Embodiments of the present disclosure relate to a color filter substrate, a method for manufacturing the same, and a touch type liquid crystal display panel.

Touch type liquid crystal display panels have been rapidly developed and gradually become the dominant products in the flat display industry. Since the consumers have increasing demands on the optical characteristics, electrical characteristics and reduced thickness of a display panel, it has become a primary object in the related industry to design and manufacture touch type liquid crystal display panels with better performance, lower cost and extreme thin profile.

As shown in FIG. 1, a typical touch type liquid crystal display panel employs the structure by adding a touch type panel 02 to a conventional liquid crystal panel 01, that is, attaching a touch type panel 02 to a completed liquid crystal panel 01 with adhesive 03.

However, as the development of the process and the increasing demand from users, shortcomings of this touch type liquid crystal display panel have become obvious. This touch type liquid crystal panel has relatively poor performances on screen light transmittance, portability and so on due to the large thickness of the additional touch type panel. In addition, due to the poor screen light transmittance, it is inevitable for the touch type liquid crystal display panel to consume more power to achieve relatively high screen brightness. Shortcomings as described above degrade the performance of the conventional touch type liquid crystal display products.

SUMMARY

One or more embodiments of the present disclosure provide a color filter substrate, a method for manufacturing the same, and a touch type liquid crystal display panel capable of improving the performance of the touch type liquid crystal display panel.

An embodiment of the present disclosure provides a color filter substrate comprises: a base substrate; a driving electrode disposed on a lower surface of the base substrate; a sensing electrode disposed on an upper surface of the base substrate; the driving electrode and the sensing electrode form a touch sensing capacitor with the base substrate as a dielectric layer.

Another embodiment of the present disclosure also provides a method for manufacturing a color filter substrate, comprising: providing a base substrate; forming a driving electrode on a lower surface side of the base substrate; and forming a sensing electrode on an upper surface side of the base substrate, wherein the driving electrode and the sensing electrode form a touch sensing capacitor with the base substrate as a dielectric layer.

Still another embodiment of the present disclosure also provides a touch type liquid crystal display panel, comprising a color filter substrate, an array substrate assembled with the color filter substrate, and a liquid crystal layer interposed between the color filter substrate and the array substrate, wherein the color filter substrate is the color filter substrate according to the present disclosure.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

Hereinafter, accompanying drawings related to the embodiments or the prior art will be briefly introduced in order to clearly explain solutions of the embodiments of the present disclosure or the prior art. It is apparent that accompanying drawings only show some embodiments of the present disclosure, and other drawings can be obtained from these drawings without any inventive labor for those skilled in the art, wherein.

DETAILED DESCRIPTION

Hereinafter, one or more embodiments of the present disclosure will be described clearly and completely by referring to the accompanying drawings. It is apparent that the embodiments described below are only a part of the embodiments of the present disclosure, rather than all of the embodiments. All of the embodiments obtained by those skilled in the art without inventive work based on the described embodiments of the present disclosure should fall within the scope of the present disclosure.

An embodiment of the present disclosure provides a color filter substrate, comprising: a base substrate; an sensing electrode disposed on the upper surface side of the base substrate; a driving electrode disposed on the lower surface side of the base substrate; wherein the driving electrode and the sensing electrode form a touch sensing capacitor with the base substrate as a dielectric layer.

In the color filter substrate according to the embodiment of the present disclosure, the driving electrode is disposed on one side of the substrate of the color filter substrate and the sensing electrode is disposed on the other side of the substrate. In this case, the driving electrode and the sensing electrode form a touch sensing capacitor with the base substrate as the dielectric layer, thus the manufacturing process of the touch sensing device is incorporated into the manufacturing process of the liquid crystal display panel, that is, a conventional touch type panel is incorporated into a liquid crystal display panel. Therefore, the touch type liquid crystal display panel has a thinner thickness and improved optical transparency and thus the performance of the touch type liquid crystal display panel can be efficiently improved.

It should to be noted that in the present embodiment, the lower surface of the base substrate refers to the surface facing the array substrate when the color filter substrate is assembled in the liquid crystal display panel. Accordingly, the other surface of the base substrate opposite to the lower surface is the upper surface of the base substrate.

Hereinafter, an exemplary color filter substrate provided by the embodiment of the present disclosure will be described in details.

Embodiment 1

Figure 1:
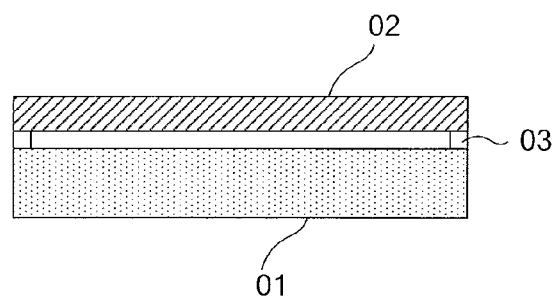
FIG. 1 is a schematic diagram illustrating structure of a touch type liquid crystal display panel in a conventional technology.
Figure 2:
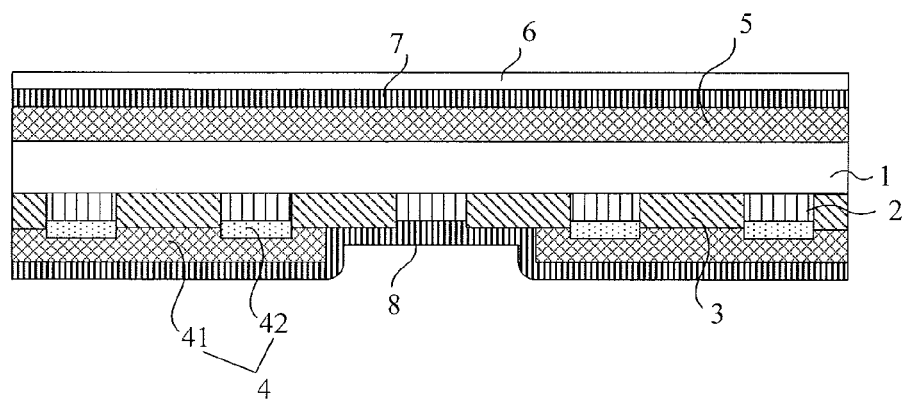
FIG. 2 is a schematic sectional view illustrating structure of a color filter substrate according to an embodiment of the present disclosure.

As shown in FIG. 2, the color filter substrate provided by the present embodiment comprises: base substrate 1; a black matrix 2 and color pixel units 3 disposed on the lower surface of the base substrate 1; a driving electrode 4 disposed on the black matrix 2 and the color pixel units 3; a passivation layer 8 disposed on the driving electrode 4; and a common electrode (not shown) on the passivation layer 8.

A polarizer sheet 6 is disposed on the upper surface of the base substrate 1, a sensing electrode 5 is disposed between the base substrate 1 and the polarizer sheet 6, and a passivation layer 7 is disposed between the sensing electrode 5 and the polarizer sheet 6. In the present embodiment, the sensing electrode 5 is disposed under the polarizer sheet 6, thus the polarizer sheet 6 can mechanically protect the sensing electrode 5 from being damaged by the frequently touch of the user, but the present disclosure is not limited thereto.

The driving electrode 4 and the sensing electrode 5 together form a touch sensing capacitor with the base substrate 1 as the dielectric layer. When a user performs a touch operation on the touch type liquid crystal display panel of the present embodiment, the touch sensing capacitor formed by the sensing electrode 5, the base substrate 1 and the driving electrode 4 can sense the touch through the change of the microcurrent caused by touching the screen. The driving electrode 4 and the sensing electrode 5 can be respectively connected to a flexible printed circuit board by wiring, so that the sensed change in electric signals can be transmitted to control circuit to be processed.

In the color filter substrate of the present embodiment, the driving electrode 4 is disposed on one side of the base substrate 1 and the sensing electrode 5 is disposed on the other side of the base substrate 1, and the driving electrode 4 and the sensing electrode 5 form a touch sensing capacitor with the base substrate 1 as a dielectric layer, so that the conventional touch type panel can be incorporated into the liquid crystal display panel, that is, the manufacturing process of the touch sensing device is incorporated into the manufacturing process of the liquid crystal display panel. Therefore, the touch type liquid crystal display panel has a thinner thickness and improved optical transparency and thus the performance of the touch type liquid crystal display panel can be efficiently improved.

In the present embodiment, the driving electrode 4 is disposed on the black matrix 2 and the color pixel units 3. Due to the uneven surface of the black matrix 2 and the color pixel units 3 disposed on the base substrate 1, the driving electrode 4 is likely to have step(s), thus the driving electrode 4 may suffer from large impedance and serious signal delay so as to bring serious problem to signal processing. In order to reduce the step and the impedance of the driving electrode 4, preferably, in the present embodiment, the driving electrode 4 comprises a metal electrode part 42 and a transparent electrode part 41. The metal electrode part 42 is disposed on the black matrix 2 and the color pixel units 3, and the transparent electrode part 41 is disposed on the metal electrode part 42. It is apparent that relative positions of the transparent electrode part 41 and the metal electrode part 42 on the base substrate 1 can be changed in another embodiment of the present disclosure. For example, the transparent electrode part 41 is disposed on the color pixel units 3 and the metal electrode part 42 is disposed on the transparent electrode part 41.

In the present embodiment, the metal electrode part 42 is disposed on the black matrix 2 and the color pixel units 3 so as to reduce the height of step between the black matrix 2 and the color pixel units 3 under the transparent electrode 41. Therefore, the step in the transparent electrode part 41 attached on the black matrix 2 and the color pixel units 3 can be reduced, the driving electrode 4 can be well connected and the quality of the signal transmission can be ensured. In addition, the resistivity of the metal electrode part 42 is smaller than the resistivity of the transparent electrode part 41, thus the provision of the metal electrode part 42 can efficiently reduce the impedance of the driving electrode 4 so as to reduce signal delay, ensure signal quality and efficiently improve the performance of the color filter substrate. When the transparent electrode part 41 is disposed on the black matrix 2 and the color pixel units 3 and the metal electrode part 42 is disposed on the transparent electrode part 41, the metal electrode part 42 can resolve problems with respect to connection reliability and large impedance of the transparent electrode part 41 due to the step.

Because a large step exists at the locations where the black matrix 2 and the color pixel units 3 adjacent to each other, preferably the metal electrode part 42 should be disposed adjacent to locations where the black matrix 2 and the color pixel units 3 adjacent to each other. Therefore, the height of step between the underlying black matrix 2 and color pixel units 3 can be efficiently reduced, or problems on connection reliability of the transparent electrode part 41 due to step can be resolved, so that the performance of the color filter substrate can be efficiently improved.

In general, the metal electrode part 42 has relatively low resistivity, but metal material is not transparent. Preferably, in order to prevent the metal electrode part 42 from influencing the display performance of the liquid crystal display panel, the projection of the metal electrode part 42 on the base substrate 1 can be within the projection region of the black matrix 2 on the base substrate 1. In the present embodiment, for example, the metal electrode part 42 is disposed on the black matrix 2. The arrangement of the transparent electrode part 41 on the base substrate 1 is not limited to the position of the black matrix 2.

Figure 3:
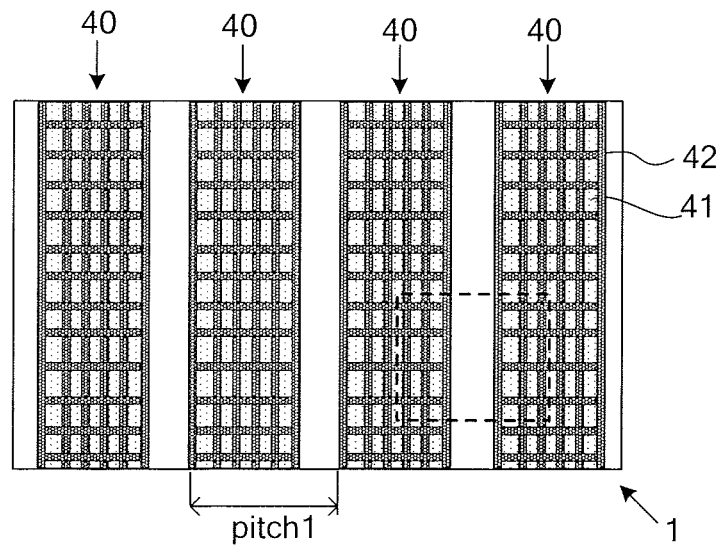
FIG. 3 is a schematic top view illustrating structure of a color filter substrate according to an embodiment of the present disclosure.
Figure 4:
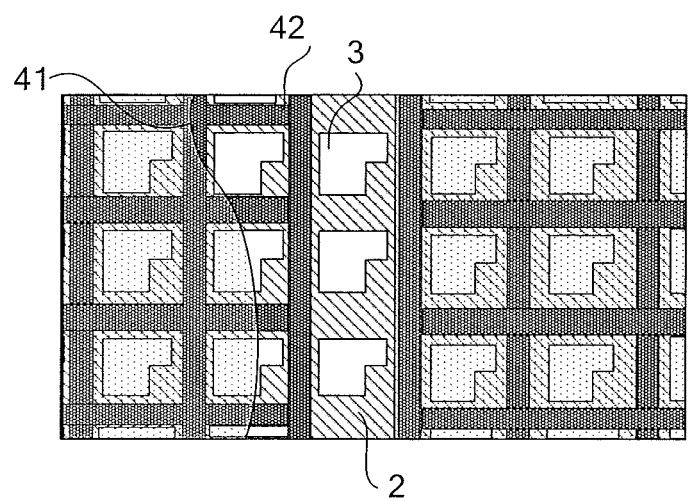
FIG. 4 is a schematic enlarged view illustrating structure in the dotted line block in FIG. 3.

FIG. 3 shows one exemplary arrangement of the driving electrode 4 in the present embodiment. Only the relative positional relationship between the transparent electrode part 41 and the metal electrode part 42 of the driving electrode 4 and the base substrate 1 is shown in FIG. 3, and the black matrix and the color pixel unit are not shown for clarity. As shown in FIG. 3, the driving electrode 4 is arranged on the base substrate in strip-shaped electrodes 40. Each of the strip-shaped electrodes 40 includes a corresponding transparent electrode part 41 and a metal electrode part 42. The metal electrode part 42 is disposed on the black matrix 2 in a grid shape, and the transparent electrode part 41 covers the metal electrode part 42. Optional, the distance pitch 1 between center lines of adjacent strip-shaped electrodes 40 may be 4 mm to 6 mm. FIG. 4 is the enlarged view illustrating structure in the dotted line block in FIG. 3. As shown in FIG. 4, the black matrix 2 is spaced apart from the color pixel units 3, the metal electrode part 42 is disposed on the black matrix 2, and the transparent electrode part 41 is disposed on the metal electrode part 42. At least one column of the black matrix 2 or color pixel units 3 is disposed between strip-shaped electrodes. FIG. 4 only shows one column of color pixel units 3 for example, but the present disclosure is not limited thereto.

Figure 5:
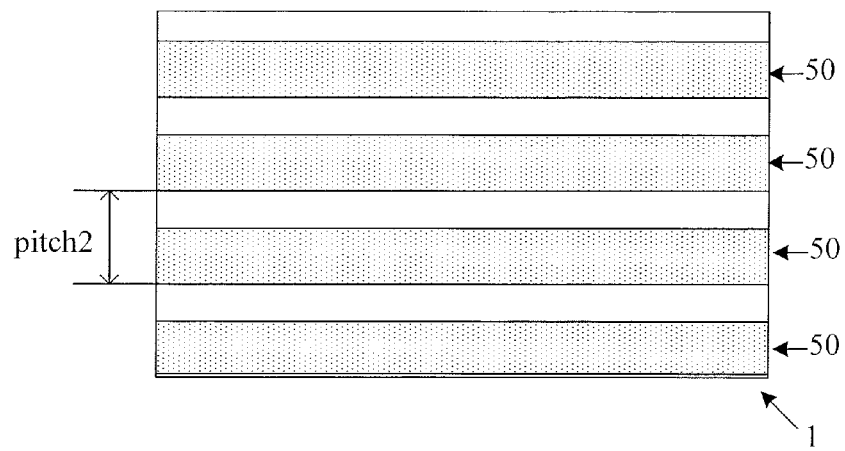
FIG. 5 is a schematic top view illustrating another structure of a color filter substrate according to an embodiment of the present disclosure.

FIG. 5 shows an exemplary arrangement of the sensing electrode 5. As shown in FIG. 5, the sensing electrode 5 includes a plurality of strip-shaped electrodes 50. Optional, the distance pitch 2 between center lines of adjacent strip-shaped electrodes 50 may be 4 mm to 6 mm.

It should to be noted that the width of the driving electrode 4 and the sensing electrode 5, the distance between center lines of the strip-shaped electrodes and the number of the strip-shaped electrodes can be adjusted according to the touch sensing resolution of the color filter substrate and the size of the color filter substrate, and the present disclosure is not limited in this regard.

Referring to FIG. 3 and FIG. 5, the projection of the strip-shaped electrodes 40 of the driving electrode 4 on the base substrate 1 should intersect the projection of the strip-shaped electrodes 50 of the sensing electrode 5 on the base substrate 1, and the intersection angle should be more than 0 degree, and for example 90 degree. The driving electrode 4 and the sensing electrode 5 form the lower and upper electrode plates of a touch sensing capacitor, respectively. It is apparent that the shapes of the driving electrode 4 and the sensing electrode 5 are not limited to the exemplary strip shape, and the direction is not limited to a horizontal or vertical direction. Embodiments of the present disclosure have no limitation on the shape and the arrangement of electrodes as long as the shape and arrangement of the driving electrode 4 and the sensing electrode 5 can form a suitable sensing capacitor.

Figure 6:
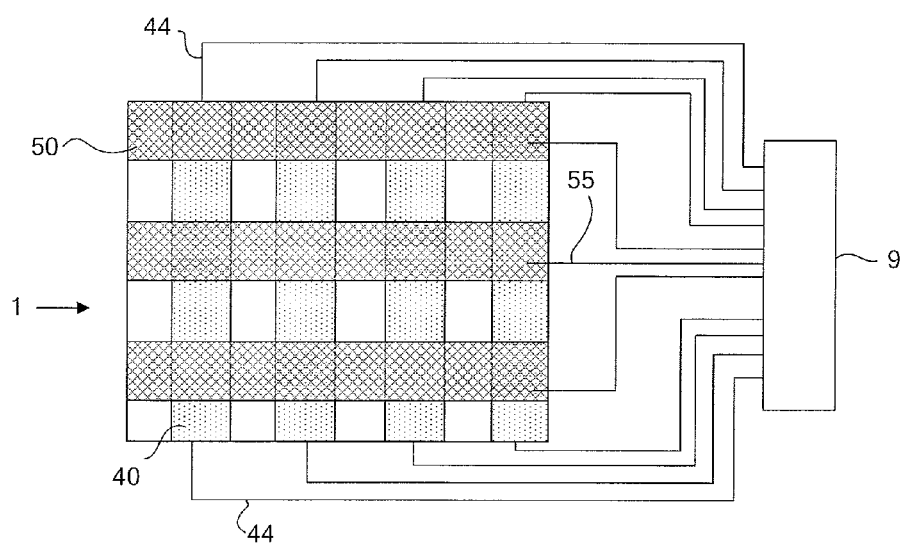
FIG. 6 is a schematic top view illustrating another structure of a color filter substrate according to an embodiment of the present disclosure.

As shown in FIG. 6, on the base substrate 1, the driving electrode 4 and the sensing electrode 5 can be connected to the flexible circuit board 9 through the wirings 44 and the wirings 55, respectively. For example, the wirings 44 are formed with a metal material, and the wirings 55 are formed with a transparent conductive material such as indium tin oxide (ITO). It is apparent that in another embodiment of the present disclosure, the wirings can be formed of other conductive material, and the embodiment of the present disclosure is not limited in this regard. In order to reduce signal delay, preferably, wirings are disposed at both ends of each strip-shaped electrode 40 of the driving electrode 4 to output signals. It is apparent that wirings (not shown) can be disposed at both ends of each strip-shaped electrode 50 of the sensing electrode 5, and the embodiment of the present disclosure is not limited in this regard. FIG. 6 does not show the color pixel unit and the black matrix and so on for clarity.

Embodiment 2

Figure 7:
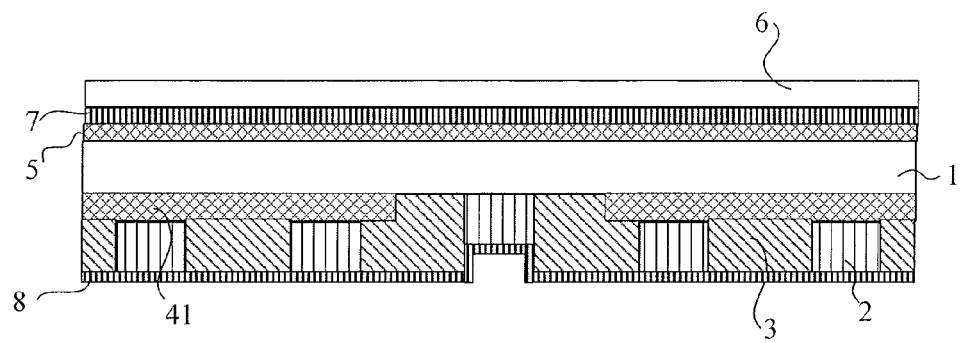
FIG. 7 is a schematic sectional view illustrating another structure of a color filter substrate according to an embodiment of the present disclosure.

As shown in FIG. 7, one of the differences between the present embodiment and Embodiment 1 is that the driving electrode 4 is disposed on the base substrate 1 while the black matrix 2 and the color pixel units 3 are disposed on the driving electrode 4. In this case, the surface of the base substrate 1 on which the driving electrode 4 is formed is even to prevent the driving electrode 4 from forming a step. Therefore, in the present embodiment, the driving electrode 4 can include a transparent electrode part 41 and a metal electrode part 42 as embodiment 1, and the embodiment of the present disclosure is limited in this regard. Other structure of the color filter substrate of the present embodiment may be identical to the color filter substrate of embodiment 1, thus the description is not repeated here.

Embodiment 3

Figure 8:
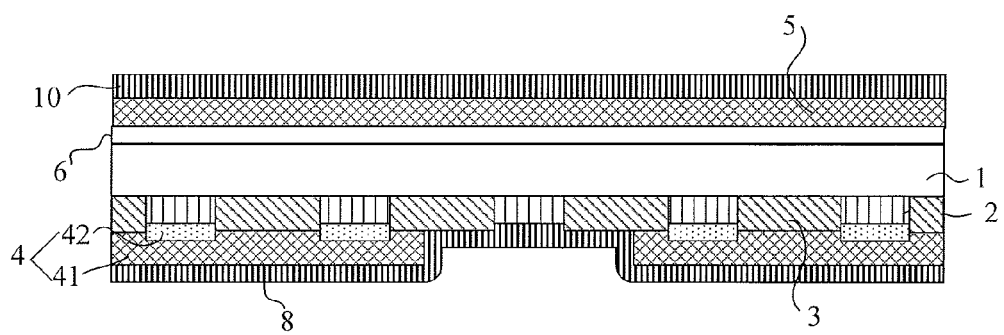
FIG. 8 is a schematic sectional view illustrating another structure of a color filter substrate according to an embodiment of the present disclosure.

As shown in FIG. 8, one of the differences between the present embodiment and Embodiment 1 is that a polarizer sheet 6 is disposed on the upper surface of the base substrate 1, the sensing electrode 5 is disposed on the polarizer sheet 6, and a passivation layer 10 is disposed on the surface of the sensing electrode 5. Other structure of the color filter substrate of the present embodiment may be identical to the color filter substrate of embodiment 1, thus the description is not repeated here.

Embodiment 4

Figure 9:
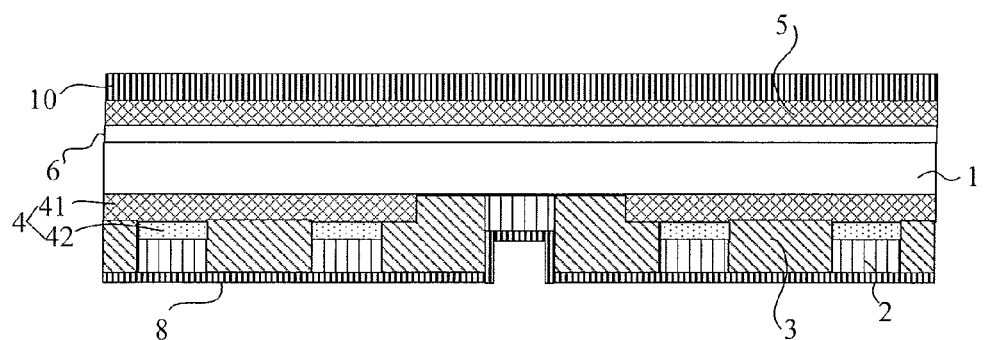
FIG. 9 is a schematic sectional view illustrating another structure of a color filter substrate according to an embodiment of the present disclosure.

As shown in FIG. 9, one of the differences between the present embodiment and Embodiment 1 is that a polarizer sheet 6 is disposed on the upper surface of the base substrate 1, the sensing electrode 5 is disposed on the polarizer sheet 6, and a passivation layer 10 is disposed on the surface of the sensing electrode 5, and also, a driving electrode 4 is disposed on the base substrate 1, and the black matrix 2 and the color pixel units 3 are disposed on the driving electrode 4. The transparent electrode part 41 of the driving electrode 4 is directly disposed on the base substrate 1, and the metal electrode part 42 is disposed on the base substrate 1 on which the transparent electrode part 41 is formed. Other structure of the color filter substrate of the present embodiment is identical to the color filter substrate of embodiment 1, thus the description is not repeated here.

Corresponding to the color filter substrate described above, a method for manufacturing a color filter substrate is further provided, comprising:

S11 of providing a base substrate; and

S12 of forming a driving electrode on a lower surface of the base substrate, forming a sensing electrode on an upper surface of the base substrate, wherein the driving electrode and the sensing electrode form a touch sensing capacitor with the base substrate as a dielectric layer.

In the manufacturing method of the color filter substrate of the present disclosure, the driving electrode is disposed on one side of the substrate of the color filter substrate and the sensing electrode is disposed on the other side of the substrate, the driving electrode and the sensing electrode form a touch sensing capacitor with the base substrate as a dielectric layer, so that the manufacturing process of the touch sensing device is incorporated into the manufacturing process of the liquid crystal display panel, that is, a conventional touch type panel is incorporated into the liquid crystal display panel. Therefore, the touch type liquid crystal display panel has a thinner thickness and improved optical transparency and thus the performance of the touch type liquid crystal display panel can be efficiently improved.

It should to be noted that, in the manufacturing method of the color filter substrate of the embodiment of the present disclosure, there is no limitation on the manufacturing sequence of the driving electrode and the sensing electrode.

Those skilled in the art may manufacture the driving electrode firstly, or manufacture the sensing electrode firstly.

Optional, depending on the position of the driving electrode, forming the driving electrode on the lower surface of the base substrate includes: forming a black matrix and color pixel units on the lower surface of the base substrate; and forming the driving electrode on the lower surface of the base substrate on which the black matrix and the color pixel unit are formed. Or, the step includes: forming the driving electrode on the lower surface of the base substrate; and forming a black matrix and color pixel units on the lower surface of the base substrate on which the driving electrode is formed.

Optional, depending on the position of the sensing electrode, forming sensing electrode on the upper surface of the base substrate includes: depositing a transparent conductive film on the upper surface of the base substrate and forming the sensing electrode by a patterning process, or disposing a polarizer sheet on the upper surface of the base substrate and depositing a transparent conductive film on the upper surface of the base substrate on which the polarizer sheet is disposed and forming the sensing electrode by a patterning process.

Figure 10:
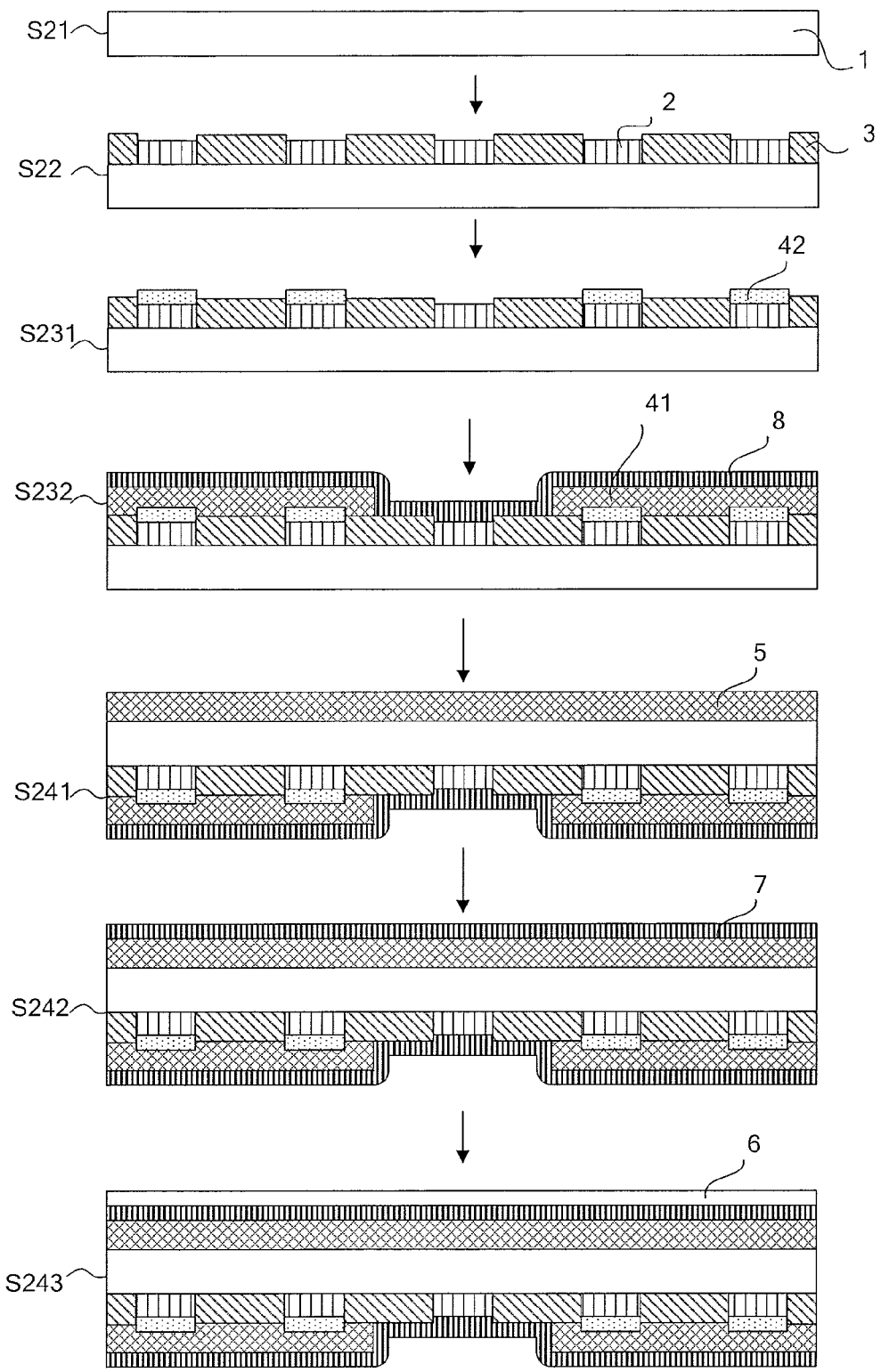
FIG. 10 is a schematic view illustrating the process flow of the manufacturing method according to an embodiment of the present disclosure.

Hereinafter, the method for manufacturing the color filter substrate according to an embodiment of the present disclosure will be described in details by taking the manufacturing method of the color filter substrate of the embodiment 1 of the present disclosure as an example. FIG. 10 is a schematic view illustrating the process flow of the manufacturing method according to an embodiment of the present disclosure. Referring to FIG. 10, the manufacturing method of the color filter substrate of the present disclosure includes S21, S22, S23 and S24.

S21 of providing a base substrate 1;

S22 of forming a black matrix 2 and a color pixel units 3 on a lower surface of the base substrate 1; and S23 of forming a driving electrode 4 on the lower surface of the base substrate 1 on which the black matrix 2 and the color pixel units 3 are formed.

For example, forming the driving electrode includes substeps S231 and S232.

S231 of depositing a metal film on the lower surface of the base substrate 1 on which the black matrix 2 and the color pixel units 3 are formed and forming a metal electrode part 42 of the driving electrode by a patterning process.

It should to be noted that in the embodiment of the present disclosure, a patterning process is the process to form an object pattern on a film, including at least photolithography, developing, etching, removing photoresist, and so on.

For example, the metal electrode part 42 of the driving electrode 4 may be formed of one or more material selected from molybdenum, aluminum and neodymium, and may be formed on the black matrix and the color pixel unit by sputtering. When forming the metal electrode part of the driving electrode by patterning, it is preferably that the projection of the metal electrode part 42 of the driving electrode 4 on the base substrate 1 is within the projection region of the black matrix 2 on the base substrate 1. Therefore, the metal electrode part 42 will not influence the light transmission of the color filter substrate, and can ensure the reliable connection of the driving electrode 4, reduce the impedance of the driving electrode 4, and improve the performance of the color filter substrate.

S232 of depositing transparent conductive film on the lower surface of the base substrate 1 on which the black matrix 2, the color pixel units 3 and the metal electrode part 42 of the driving electrode 4 are formed, forming the transparent electrode part 41 of the driving electrode 4 by a patterning process, and forming a passivation layer 8 on the transparent electrode part 41.

In this step, for example, the transparent electrode part 41 of the driving electrode 4 may be formed with indium tin oxides (ITO) which is formed by a sputtering process, and then performing a patterning process on the ITO film.

In another embodiment of the present disclosure, in the case that the metal electrode part is formed on the transparent electrode part of the driving electrode in the manufactured driving electrode of the color filter substrate, when forming the driving electrode, the transparent electrode part of the driving electrode is formed firstly, then the metal electrode part of the driving electrode is formed. For example, the steps can be performed as follows: depositing a transparent conductive film, and forming the transparent electrode part of the driving electrode by a patterning process; forming a metal film on the lower surface of the base substrate on which the transparent electrode part of the driving electrode is formed, and forming the metal electrode part of the driving electrode by a patterning process.

It is apparent that after forming the driving electrode, the manufacturing method of the color filter substrate according to the embodiment of the present disclosure may further include steps of forming a common electrode on the lower surface of the base substrate and so on, which is omitted here for simplicity.

S24 of forming sensing electrode 5 on the upper surface of the base substrate 1.

For example, forming the sensing electrode 5 may include sub-steps S241, S242 and S243.

S241 of depositing a transparent conductive film on the upper surface of the base substrate 1, and forming a sensing electrode 5 by a patterning process.

S242 of forming a passivation layer 7 on the upper surface of the base substrate 1 on which the sensing electrode 5 is formed.

S243 of disposing a polarizer sheet 6 on the upper surface of the base substrate 1 on which the sensing electrode 5 and the passivation layer 7 are formed.

In another embodiment of the present disclosure, when the sensing electrode is on the polarizer sheet, forming the sensing electrode may include: forming the polarizer sheet on the upper surface of the base substrate; depositing a transparent conductive film on the upper surface of the base substrate on which the polarizer sheet is disposed, and forming the sensing electrode by a patterning process. In this example, after forming the sensing electrode, a passivation layer can be further formed on the sensing electrode in order to efficiently protect the sensing electrode.

It should to be noted that the present embodiment takes the color filter substrate of the embodiment 1 as an example to describe the method for manufacturing the color filter substrate according to embodiment of the present disclosure, but the present disclosure is not limited thereto. Those skilled in the relevant technical field art can obtain various color filter substrates of the disclosure, for example, the color filter substrates as shown in FIGS. 7 through 9, by adjusting the sequence of forming the black matrix, the color pixel unit, the driving electrode and the sensing electrode. That is to say, sequence of operations of steps S22, S23 and S24 of the present embodiment may be adjusted in another embodiment of the present disclosure, and the present disclosure is not limited in this regard.

Further an embodiment of the present disclosure also provide a touch type liquid crystal display panel, comprising a color filter substrate, an array substrate assembled with the color filter substrate, and liquid crystal layer interposed between the color filter substrate and the array substrate, wherein the color filter substrate is the color filter substrate according to one of the embodiments of the present disclosure.

According to the touch type liquid crystal display panel of the embodiment of the present disclosure, the driving electrode is disposed on one side of the base substrate of the color filter substrate and the sensing electrode is disposed on the other side of the base substrate, and the driving electrode and the sensing electrode form a touch sensing capacitor with the base substrate as the dielectric layer. Therefore, the manufacturing process of the touch sensing device is incorporated into the manufacturing process of the liquid crystal display panel, that is, a conventional touch type panel is incorporated into the liquid crystal display panel. Therefore, the touch type liquid crystal display panel has a thinner thickness and improved optical transparency and thus the performance of the touch type liquid crystal display panel can be efficiently improved.

Only embodiments of the present disclosure are described above. It should be understood that scope of the present disclosure is not limited thereto. Those skilled in the art may make modifications or substitution without departing the principle of the present disclosure. All such modifications are intended to be included in the scope of the present disclosure. Therefore, the protection scope of the present disclosure is defined in the claims.

What is claimed is:

1. A color filter substrate, comprising:
   a base substrate;
   a driving electrode disposed on a lower surface of the base substrate;
   a sensing electrode disposed on an upper surface of the base substrate;
   the driving electrode and the sensing electrode form a touch sensing capacitor with the base substrate as a dielectric layer; wherein
   the driving electrode comprises a metal electrode part and a transparent electrode part that are sequentially disposed;
   the metal electrode part is disposed on the transparent electrode part or under the transparent electrode part; and
   the projection of the metal electrode part on the substrate is within the projection region of the black matrix on the substrate.

2. The color filter substrate according to claim 1, further comprising a black matrix and color pixel units disposed on the lower surface of the base substrate, and
   wherein the black matrix and the color pixel units are disposed on the lower surface of the base substrate, and the driving electrode is disposed on the black matrix and the color pixel units; or
   the driving electrode is disposed on the lower surface of the base substrate, and the black matrix and the color pixel unit are disposed on the driving electrode.

3. The color filter substrate according to claim 1, further comprising a polarizer sheet on an upper surface side of the base substrate, and
   wherein the polarizer sheet is disposed on the upper surface of the base substrate, and the sensing electrode is disposed on the polarizer sheet; or
   the sensing electrode is disposed on the upper surface of the base substrate, the polarizer sheet is disposed on the sensing electrode, and a passivation layer is disposed between the sensing electrode and the polarizer sheet.

4. The color filter substrate according to claim 1, wherein the driving electrode comprises at least two strip-shaped electrodes, the sensing electrode comprises at least two strip-shaped electrodes, and the projection of the strip-shaped electrodes of the driving electrode on the substrate is intersect with the projection of the strip-shaped electrodes of the sensing electrode on the base substrate.

5. The color filter substrate according to claim 2, wherein the driving electrode comprises at least two strip-shaped electrodes, the sensing electrode comprises at least two strip-shaped electrodes, and the projection of the strip-shaped electrodes of the driving electrode on the substrate is intersect with the projection of the strip-shaped electrodes of the sensing electrode on the substrate.

6. The color filter substrate according to claim 1, wherein the driving electrode comprises at least two strip-shaped electrodes, the sensing electrode comprises at least two strip-shaped electrodes, and the projection of the strip-shaped electrodes of the driving electrode on the substrate is intersect with the projection of the strip-shaped electrodes of the sensing electrode on the substrate.

7. The color filter substrate according to claim 1, wherein the driving electrode comprises at least two strip-shaped electrodes, the sensing electrode comprises at least two strip-shaped electrodes, and the projection of the strip-shaped electrodes of the driving electrode on the substrate is intersect with the projection of the strip-shaped electrodes of the sensing electrode on the substrate.

8. The color filter substrate according to claim 3, wherein the driving electrode comprises at least two strip-shaped electrodes, the sensing electrode comprises at least two strip-shaped electrodes, and the projection of the strip-shaped electrodes of the driving electrode on the substrate is intersect with the projection of the strip-shaped electrodes of the sensing electrode on the substrate.

9. The color filter substrate according to claim 4, wherein a distance between center lines of adjacent strip-shaped electrodes of the driving electrode or a distance between center lines of adjacent strip-shaped electrodes of the sensing electrode is 4 mm to 6 mm.

10. A method for manufacturing a color filter substrate, comprising:
    providing a base substrate;
    forming a driving electrode on a lower surface side of the base substrate; and
    forming a sensing electrode on an upper surface side of the base substrate,
    wherein the driving electrode and the sensing electrode form a touch sensing capacitor with the base substrate as a dielectric layer;
    forming the driving electrode comprises:
    depositing a transparent conductive film, forming a transparent electrode part of the driving electrode by a patterning process;
    forming a passivation layer on the transparent electrode part;
    depositing a metal film on the lower surface of the base substrate on which the transparent electrode part of the driving electrode is formed; and
    forming a metal electrode part of the driving electrode by a patterning process;
    or
    forming the driving electrode comprises:
    depositing a metal film and forming a metal electrode part of the driving electrode by a patterning process;

depositing a transparent conductive film on the lower surface of the base substrate on which the metal electrode part of the driving electrode is formed; and forming a transparent electrode part of the driving electrode by a patterning process.

11. The method according to claim 10, wherein forming the driving electrode on the lower surface side of the base substrate comprises:

forming a black matrix and color pixel units on a lower surface of the base substrate and forming the driving electrode on the lower surface on which the black matrix and the color pixel unit are formed; or forming the driving electrode on the upper surface of the base substrate and forming a black matrix and color pixel units on the upper surface on which the driving electrode is formed.

12. The method according to claim 10, wherein forming the sensing electrode on the upper surface side of the base substrate comprises:

depositing a transparent conductive film on the upper surface of the base substrate and forming the sensing electrode by a patterning process.

13. The method according to claim 10, wherein forming the sensing electrode on the upper surface side of the base substrate comprises:

disposing a polarizer sheet on the upper surface of the base substrate, depositing a transparent conductive film on the upper surface of the base substrate on which the polarizer sheet is formed, and forming the sensing electrode by a patterning process.

14. A touch type liquid crystal display panel, comprising:

a color filter substrate, an array substrate assembled with the color filter substrate, and a liquid crystal layer interposed between the color filter substrate and the array substrate, wherein the color filter substrate is the color filter substrate according to claim 1.

* * * * *